July 6, 1948.   K. RATH   2,444,675
EXPOSURE TIME CONTROL FOR PHOTOGRAPHIC
PRINTING APPARATUS
Filed July 19, 1945   3 Sheets-Sheet 2
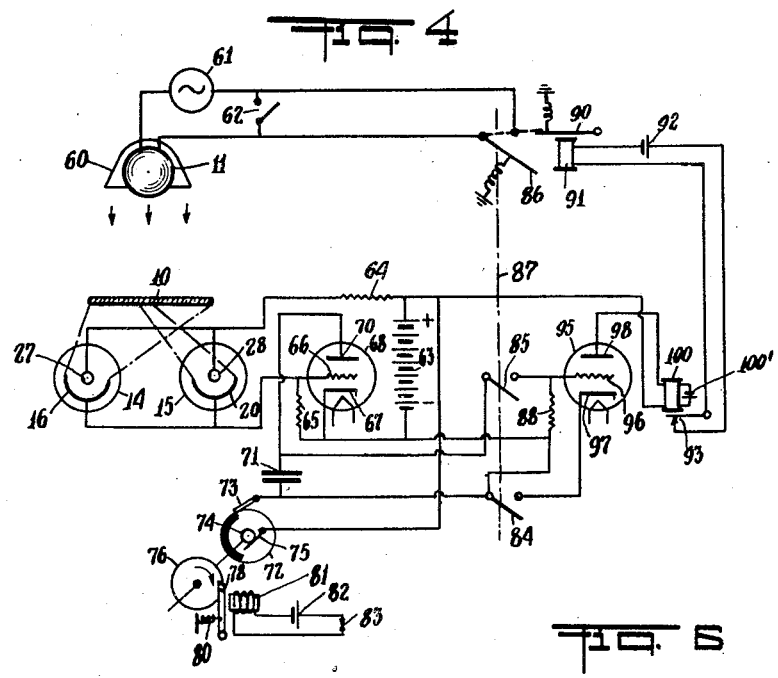
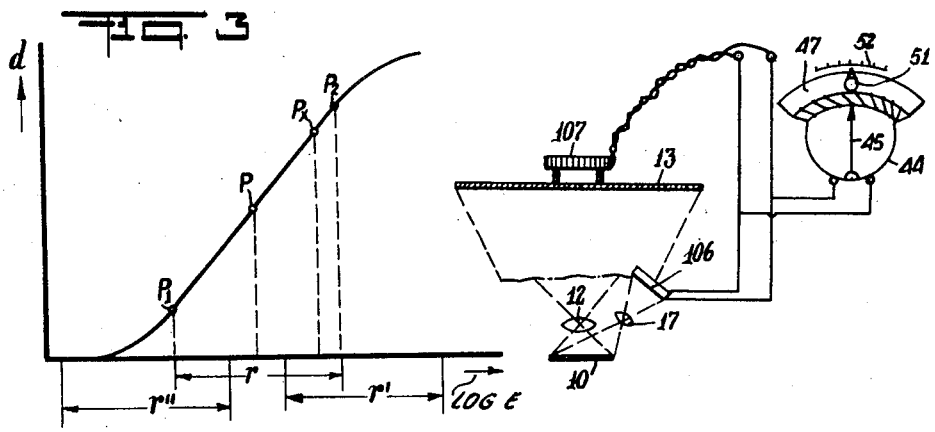
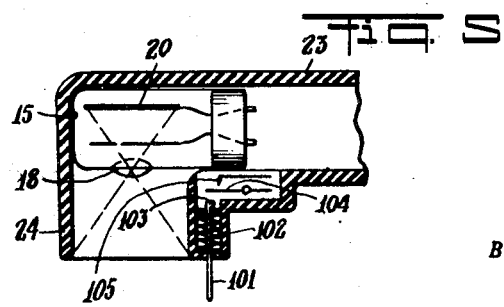
INVENTOR.
BY

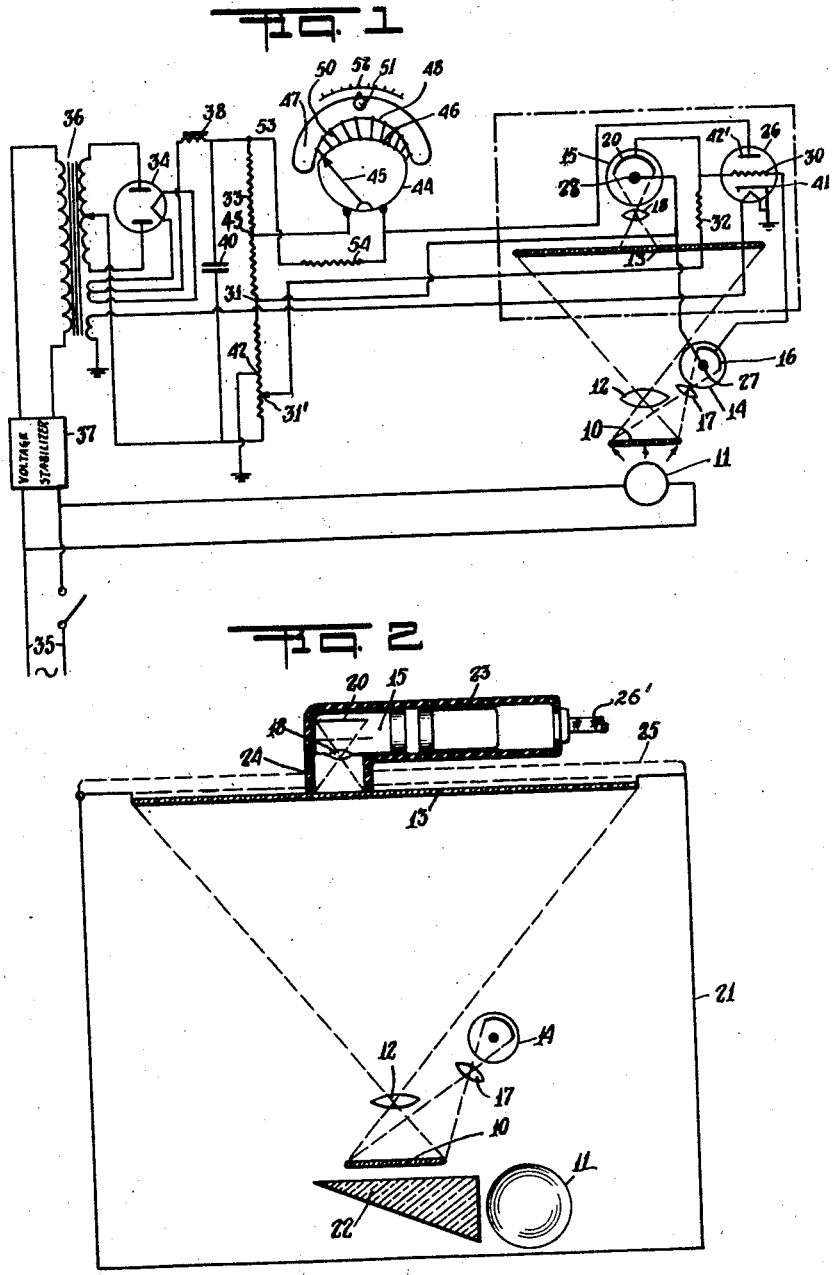

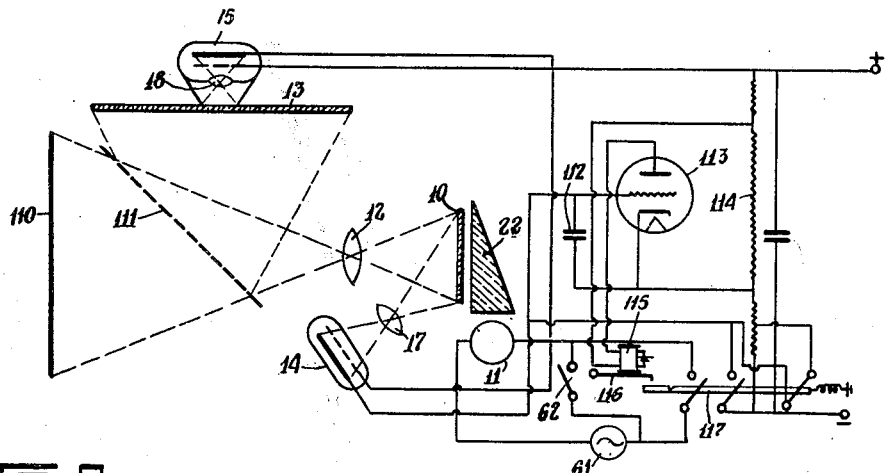
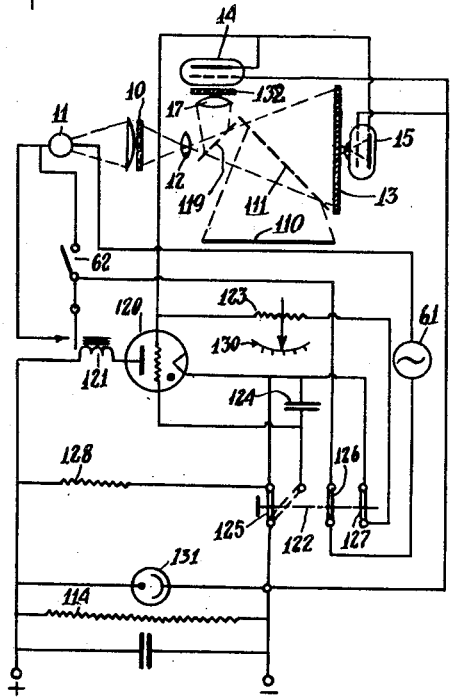

Patented July 6, 1948

2,444,675

UNITED STATES PATENT OFFICE 2,444,675

EXPOSURE TIME CONTROL FOR PHOTOGRAPHIC PRINTING APPARATUS

Karl Rath, New York, N. Y.

Application July 19, 1945, Serial No. 605,908

11 Claims. (Cl. 88—24)

My invention relates to photographic exposure control, more particularly to a system for and method of determining the correct exposure in printing a positive from a photographic negative, or vice versa, by either the contact or projection-printing method.

The use of a photoelectric densitometer or light meter for photographic print control involves a number of problems which make it difficult in the hands of the less experienced photographer or amateur to determine the proper exposure or printing time in a simple and quick manner. The difficulties encountered in designing a simple print control device are due for the most part to the nature of the photographic image which makes it necessary to use the indication of the densitometer discriminately and judiciously or to carry out exact contrast measurements involving mental calculations, delays and other drawbacks.

Accordingly, an object of the present invention is to provide a novel exposure control system of the above type which is both simple in design and easy to operate; which may be used both for manual time determination and for automatic print control; which will allow of giving full consideration to the nature of the photographic image in a most simple manner; and which results in a properly exposed print by following a simple method or procedure which may be acquired easily and with a minimum of experience.

These and further objects of the invention will become more apparent from the following detailed description taken in reference to the accompanying drawings forming part of this specification and wherein:

Figure 1 is a diagram of a photographic print control system for manual exposure determination or printing time control embodying the principles of the invention;

Figure 2 shows a practical apparatus suitable for carrying out a print control according to the invention;

Figure 3 is an explanatory graph showing the well known relation between print density and exposure for the average photographic printing material;

Figure 4 is a diagram similar to Figure 1 illustrating a print control system designed for automatic printing time adjustment;

Figure 5 is an enlarged partial view of Figure 2 illustrating an improved feature especially suitable for use in connection with the printing device shown in Figure 4;

Figure 6 is a diagram of an exposure control system illustrating the use of self-generating-type photoelectric cells in connection with the invention;

Figure 7 is another diagram illustrating a modified automatic print control system embodying the principles of the invention;

Figure 8 is a partial diagram illustrating a further feature of improvement suitable for use in connection with the invention; and Figure 9 is a diagram showing still a further modification of an automatic print control system according to the invention.

Like reference numerals identify like parts throughout the different views of the drawings.

Referring more particularly to Figure 1, I have shown at 10 a photographic negative such as a plate or film which may be of the miniature or any other size and which, in the example shown, is illuminated by a diffuse light source in the form of an electric bulb 11. Illumination systems for the negative film or plate in contact or projection-printing devices using either diffuse or condensed light are well known in the art and further description thereof is deemed unnecessary.

The image of the film or plate 10 is projected by the aid of a suitable projection lens 12 upon a ground glass or viewing screen 13, such as the projection screen of a standard enlarging easel. According to the ordinary procedure of making photographic prints, after the image on the screen or ground glass 13 has been properly focussed in the case of an adjustable focussing enlarger, the light 11 is turned off and a sheet of printing paper placed upon the screen 13. Thereafter, the light is turned on again to expose the paper for a definite period, depending upon the density of the negative and the speed or sensitivity of the printing paper or other negative material used.

The determination of the correct exposure or printing time is one of the main problems in securing a correctly exposed photograph or print, the remaining constants such as the intensity of the light source 11, the paper, speed, etc., being easily determinable and remaining constant for a given printing material and apparatus used. As is understood, the above conditions apply to any kind of printing whether projection printing with fixed or adjustable enlarging ratio or contact printing as well as to the printing on paper, film, or any other sensitive material for producing either a negative or positive print.

One way to determine the proper printing or exposure time is to measure the density of the negative or other transparency by the aid of a suitable photometer or densiometer and to convert the result of such measurement into proper terms of exposure or printing time for a given emulsion or paper speed. The safest way to accomplish this purpose is to determine the so-called "specific average" density as compared with the total or "integrated" density of the negative. To determine the former, the light meter must be so designed as to allow of a spot measurement of the various elementary areas of the negative image. By first measuring the density of the brightest spot or area and then measuring the density of the darkest spot or area of the scene or subject on the negative which it is desired to render in their proper tone relation in the final print, and taking the average or mean value of both measurements, the "specific average" density is obtained which may serve as a safe basis for determining the correct exposure or printing time for any kind of scene or subject. Thus, assuming a density of the darkest spot to be equal to 100 arbitrary units and the density of the brightest spot to be equal to 10 such units, the "specific average" density will be $$\frac{100+10}{2}=55 \text{ units}$$

Spot photometers for photographic print control have already become known, but it will be understood that the use of the above method is both laborious and cumbersome and requires considerable experience and judgment on the part of the photographer. This method, therefore, is not suitable for the less experienced and less technically inclined amateur. It is the purpose of the present invention to provide a novel print control method and apparatus which is both simple in design and easy to operate and which will insure a correct exposure by a simplified procedure and without requiring any mental calculations and other undesirable operations of the type mentioned hereinabove.

With the above and other objects in view, the invention contemplates essentially the combination of two simultaneous density measurements by the aid of a pair of light-sensitive devices, one of said measurements being based on the "integrated" density of the negative and the other measurements being based on the "specific average" density obtained from a single spot measurement of the important pictorial object or fractional area of the negative which it is desired to render correctly in the final print in preference to the other portions of the image area. Except for the selection of the pictorially important spot or object which in the majority of cases will be a simple and obvious matter, the operation is fully automatic and not dependent in any way on the personal factor.

For the purpose of this invention and in order to provide a simplified procedure to be followed in the use of the novel apparatus, all negatives may be advantageously divided as far as density distribution is concerned into two classes, viz.: those of even relative density distribution, hereafter referred to as "average" negatives, and those of uneven relative density distribution hereafter referred to as "background" pictures or negatives. In the former or "average" type negative, all the portions of the image are of more or less like pictorial interest or value such as is the case in nearby landscapes, architectural views, single close-up and groups. Such negatives are characterized by the fact that they have no pictorially unimportant background and that the dark and light areas are more or less evenly distributed over and occupy equal relative portions of the total scene or image field.

In negatives of the second type or so-called "background" scenes, on the other hand, a light object or portion such as a person, head, etc., may be set off against a relatively large and dark background, and vice versa, that is, the dark and light areas occupy substantially different relative portions of the total scene or image field. After a relatively short experience, the photographer will be able to classify each negative as coming under one of the above categories without difficulty. Once the type of negative has been determined, the density measurement and print control will be a simple matter without requiring any calculations and other delays, as will appear from the following.

I have shown for this purpose in Figure 1 a pair of photoelectric cells in the form of phototubes 14 and 15 which may be of any known type such as of the high vacuum or gas-filled potassium or any other type known in the art. Phototube 14 is arranged to have its cathode 16 excited by light emanating from the entire negative area by the provision of a suitable collecting lens 17. Hence, the output current of this tube varies according to the total or "integrated" density of the negative area, as is understood.

The second phototube 15 is arranged to be variably positioned upon the screen 13 for selecting a desired spot or fractional area and collecting the light therefrom by the aid of a collecting lens 18 and impinging it upon the light-sensitive cathode 20. Accordingly, tube 15 measures the "specific average" density of a selected fractional portion of the negative representing the pictorially important object in the case of a background picture, such as the head of a person or any other pictorially important part which it is desired to render correctly in the final print.

A practical embodiment of such a print control device is shown diagrammatically in Figure 2. In the latter, item 21 is a casing housing the negative 10 mounted in a suitable holder or gate (not shown), the projection lens 12, the first fixedly mounted phototube 14, and a suitable illumination system for the negative in the form of an electric bulb 11 and a prismatic member 22 of refractive light-transmitting material such as glass or an equivalent synthetic material, such as an acrylic plastic or the like. By the proper design of the prismatic member 22, the light rays of the bulb 11 entering the base of said member will follow a multiple internal path in such a manner as to provide an evenly diffused luminous surface irradiating the negative 10. The surface of member 22 adjacent the negative 10 may be suitably sandblasted to obtain an evenly diffuse illumination, as is understood. An arrangement of this type results in the prevention of elaborate illumination systems and makes both for simplicity and compactness of the apparatus.

The adjustable phototube 15 is shown mounted in an oblong casing 23 in the form of a handle and having a tubular extension 24 forming a light baffle for restricting the light collected by the lens 18 and impinged upon the cathode 20. In this manner, the photoelectric device may be easily shifted to any position upon the ground glass 13 to effect a desired selective or spot measurement of the density or brightness of any desired fractional area of the negative. A hinged cover 25 serves to hold a sheet or printing paper in flat condition upon the ground glass during the actual exposure in a manner well known. As is understood, the adjustable phototube may be connected to the rest of the apparatus through a flexible connecting cord 26', as indicated in the drawing.

According to the present invention, the output currents of both phototubes 14 and 15 are combined or added and the sum of the currents used to control the grid of an amplifier tube 26 of any known type such as a triode as shown in the drawing, to produce an amplified output current for operating a meter or current indicator which may be directly calibrated in densities, or for operating an automatic printing control device shown in the subsequent figures. For this purpose, in the example shown, the cathodes 16 and 20 of the phototubes 14 and 15 are both connected directly to the grid 30 of the amplifier 26, on the one hand, and to a point 31' of negative potential through a load resistance 32, on the other hand.

The potential source shown is in the form of a potentiometer resistance 33 connected to the output of a double-wave rectifier 34 energized from an A. C.-Power supply source 35 by way of a transformer 36 in a manner well known in the art. A voltage stabilizer 37 serves to provide a constant input potential to insure stability and high measuring accuracy. The output of the rectifier includes the usual smoothing filter in the form of series inductance 38 and by-pass condenser 40, to remove the fluctuations or ripples from the operating potential for the photo-tubes and amplifier energized by the potentiometer 33.

To complete the phototube and amplifier circuit, the anodes 27 and 28 of the phototubes 14 and 15 are connected to a point 31 of positive potential on the potentiometer 33, the cathode 41 of the amplifier 26 is connected to the ground or zero potential point 42 of the potentiometer 33, while the plate 42' of the amplifier 26 is connected to a suitable high potential point 43 on the potentiometer 33 through a current indicator 44 having a pointer 45 and a cooperating scale 46 which may be directly calibrated in negative densities or serve to cooperate with an adjustable computer for directly indicating the exposure time for any given paper speed. For the latter purpose, there is shown a scale member 47 provided with a scale 48 representing exposure or printing times and cooperating with the pointer 45. Scale 48 advantageously has equal scale divisions and if the deflection of the pointer 45 follows a nonlinear law as a function of the negative density, the pointer scale and scale 48 may be correlated by suitable guide or lead lines 50 in a manner customary in photographic exposure meters. In order to consider various paper speeds, scale member 48 is adjustable by means of a knob 51 provided with an index arranged to cooperate with a stationary scale 52 representing the speeds of various printing papers in suitable units.

In order to compensate the normal or quiescent plate current of the amplifier 26 through the meter 44, the right-hand terminal of the latter is further connected through a resistance 54 to a point 53 on the potentiometer being at a higher potential than the point 43, to produce a current equal to and opposite the normal steady or quiescent plate current through the meter.

In an arrangement afore-described, the use of two photo-electric cells producing a combined output, one being responsive to the "total inte- grated" density of the negative and the other measuring the "specific average" density of a selected spot or fractional area of the negative, will result in an exposure substantially eliminating the error in the total or integrated density, especially in case of background scenes or other scenes comprising a relatively small pictorially important object set off against a relatively large and less important surrounding or background of substantially different brightness.

The operation of the invention will be further understood by reference to Figure 3 which shows the normal characteristic curve of photographic printing material, wherein the ordinate $d$ represents the reflected density as a function of the logarithm of the exposure log E or printing time in the case of constant illumination. The curve shown has the usual threshold and shoulder sections and intermediate straight-line portion $P_1$—$P_2$. The problem of insuring a properly exposed print consists in so positioning the exposure range $r$ corresponding to the range of density of the negative being printed as to fall within the straight section $P_1$—$P_2$ of the curve.

This could easily be accomplished in case of so-called "average" scenes, wherein the total or integrated density obtained with a single measurement by phototube 14 in the example shown, represents the proper value for determining the exposure and the meter may be so designed as to place or anchor the exposure upon the center point P of the curve for the particular paper or other printing material used.

In an arrangement of this type, however, using only a single measurement, if the scene is of the "background" type, the total or integrated measurement will no longer be the same, although the relative brightness or "specific" density between the light and dark areas may have remained constant. Accordingly, the exposure will be shifted towards the toe $P_1$ or the bend $P_2$ of the curve, thereby resulting in an over- or under-exposure, as indicated by $r'$ and $r''$ in the drawing.

According to the present invention, this defect is substantially eliminated in the manner described in the following. The system according to the invention may be so designed that for "average" views with relatively even density distribution, the combined outputs of both phototubes result in an average exposure coinciding substantially with the midpoint P of the characteristic curve for the particular printing paper used. If, now, the relative bright areas representing the object of major interest are less than the dark areas, the total average indication will be too small, which normally would result in an over-exposure. Since, however, in the present case the area of major interest has the greater brightness set against the darker area or background, the output of the adjustable phototube will increase, provided the proper selective measurement is made by placing the measuring head over the pictorially important area upon the ground glass of the device. Accordingly, the total photoelectric output current increases so as to bring the exposure back to or shift it in the direction of its proper value. The same applies if the relative bright areas predominate over the dark areas of the picture.

Referring to Figure 4, I have shown a fully automatic print control system embodying the principles of the invention. For the sake of simplicity, the two phototubes 14 and 15 are shown directly excited by the total and fractional areas of the negative 10 such as would be the case in a contact printing arrangement. The light bulb 11 is shown provided with a suitable reflector 60 and connectable to a source 61, such as an ordinary alternating current house-lighting circuit, by the aid of a manually operable light switch 62. In addition, the lamp 11 may be connected to the source 61 by an automatic light-switch 86 for effecting an automatic exposure control in the manner described in detail in the following.

Both phototubes 14 and 15 are again connected in parallel to each other and energized by a high voltage source shown in the form of a battery 63 in series with a pair of resistors 64 and 65, the former being inserted in the positive lead to the battery and serving to reduce the battery voltage, and the latter being inserted in the negative supply lead and serving as an input or coupling element for an amplifier tube 68 by a direct coupling to the grid 66 and cathode 67 of the tube. The anode or plate 70 of tube 68 is connected to the positive pole of the battery 63 through a condenser 71 and a rotating interrupter 72 having a sliding contact or brush 73, a conducting segment 74 and a slip ring 75, as shown and readily understood from the drawing.

Interrupter 72 may be driven at constant speed by a suitable prime mover such as a clock work indicated simply by a disk 76 and tending to rotate in the direction of the arrow but normally being arrested by a pawl 78 forming the armature of a relay 81 and urged to engage a notch of the disk 76 by the action of a spring 80. Relay 81 is excited by a small battery or equivalent voltage derived from a common power supply of the system through a switch or contact arrangement 83.

Condenser 71 may be connected in parallel to an input load resistance 88 of a further amplifier 95 by the aid of a manually operable switch 85, resistance 88 being normally disconnected from the cathode of the tube 95 by a further switch 84 operable together with the switch 85 through a common operating element such as a push-button or the like indicated at 87. In the closed position of switches 84 and 85, resistance 88 will be connected directly in parallel to both the condenser 71 and the path between the grid 96 and cathode 97 of the tube 95.

The anode 98 of tube 95 is connected to the positive potential point of the source 63 through a relay winding 100 shunted by a suitable polarizing source such as a battery 100' and having an armature and cooperating contact 93 connected in a further circuit including a current source 92 and relay 91. Relay 91 has an armature 90 normally urged in an upward position shown in the drawing by a spring and serving to hold the exposure control switch 86 in the closed position shown by dotted lines, upon operation of the common control device 87 for the switches 84, 85 and 86.

The operation of the system shown in Figure 4 is as follows:

After the phototube 15 has been properly positioned upon the negative 10, upon closing of the manual light-switch 62, contacts 83 are temporarily closed, such as by pressing and subsequently releasing a push-button, whereby to release the prime mover or disk 76 for one revolution and resulting in a charge of condenser 71 by the battery 63 through the tube 68 during a predetermined time period determined by the size of the conducting segment 74 and speed of the disk 72. Accordingly, condenser 71 will be charged to a potential depending upon the impedance of the tube 68, which in turn is a function of the bias potential across the grid resistance 65 and, accordingly, of the combined light intensity exciting the phototubes 14 and 15. By using a source 63 of sufficiently high voltage, the charging periods of the condenser 71 may be restricted to the straight-line or initial portion of the exponential charging curve, whereby to insure a practical linearity between the final charging potential of the condenser 71 and the density of the negative being determined.

A practical device for performing the charging of the condenser 71 or storing the density measurement is shown in Figure 5, wherein the housing 23 of the phototube 15 is provided with a projecting pin 101 urged to its projecting position by a spring 102 and having an inner head 103 adapted to momentarily engage the end of a cantilever-type contact spring 104 when the pin 101 is pushed inwardly of the housing. Contact spring 104 cooperates with a fixed contact 105 corresponding to the switch or contact arrangement 83 of Figure 4. Accordingly, by placing the device 23 upon the selected portion of the negative, pin 101 being pushed inwardly against the spring 102 will cause a momentary closure of the contacts 104 and 105, whereby to unlock the interrupter 72 by the relay 81 for one revolution and to charge the condenser 71 to a value proportional to the negative density. During the return of the pin 101, upon removing the housing 23, no closure of contacts 104 and 105 will occur, as the spring or blade is moved in an opposite direction by the head 103.

Switch 62 is then opened, a sheet of printing paper placed upon the negative 10 and multiple switch 84, 85, 86 closed by operating the common operating member 87 which may have the form of a control knob, push-button or the like. Accordingly, the anode circuit of the tube 95 will be closed by switch 84 and a high negative potential will be applied to the grid 96 of the tube from the previously charged condenser 71. Hence, tube 95 will be initially non-conducting and will assume its conductivity only after the negative charge on the grid 96 has leaked off through the grid resistance 88. After the grid potential has reached a predetermined low value to cause a sufficient anode current flow, polarized relay 100 will respond, opening its contact 93 and in turn interrupting the lighting circuit of lamp 11. In other words, the time of response of relay 100 from the moment of closing the light switch is dependent on the previously measured density of the negative 10 stored in the form of an electric charge upon the condenser 71.

Simultaneously with the closing of switches 84, 85 the light switch 86 closes the lamp circuit, thus initiating the exposure. Switch 86, and with it switches 84 and 85, are held in the closed position by the armature 90 of relay 91, the former being provided with a nose or pawl engaging the switch member 86 until its release by the opening of the circuit of battery 92 by the relay 100 in the anode circuit of tube 95.

As will be understood from the foregoing, the invention is not limited to the use of photoelectric tubes as shown in the previous embodiments, in that any type of photoelectric device may be employed energizing a suitable indicator. Thus, in Figure 6 there are shown schematically a pair of self-generating type or photovoltaic cells 106 and 107 such as of the copper-cuprous oxide, the iron-selenium or any other known type, the former being fixed to measure the total or integrated negative density and the latter being adjustable to effect a specific or spot measurement in substantially the same manner as described hereinbefore. The outputs of both cells are combined by connecting them in parallel, as shown, and serve to energize a suitable microammeter-type indicator for indicating the density or exposure in a manner substantially similar to that described hereinbefore.

Figure 7 shows a further automatic print control system according to the invention, wherein the charging potential of a condenser is directly utilized to control the operation of a polarized relay terminating the exposure, whereby to eliminate one of the operations required in Figure 4. For this purpose, the negative is simultaneously projected upon a viewing screen 13 and upon a printing screen or surface 110 by the provision of a fixed semi-transparent reflecting mirror 111 arranged with its plane forming a suitable angle with the optical axis of the objective or lens 12 in a manner well understood and known in connection with so-called single-shot color cameras. The screen 111 may consist of a thin, transparent diaphragm of Celluloid or an equivalent plastic material coated with finely-divided silver or other metal in a manner well known with so-called pellicle screens used in color cameras.

The phototubes 14 and 15 which, in the example shown, are connected in series in place of the parallel connection according to the preceding figures, serve as charging impedance for the condenser 112 from the high voltage source indicated in the form of potentiometer 114, said condenser being connected between the grid and cathode of an electronic amplifier tube 113. The anode circuit of the amplifier includes a relay 115 suitably polarized so as to attract its armature 116 at a predetermined anode current. The multiple switch 117 serves to close both the circuit of lamp 11 and to apply a negative potential to the grid of the tube 113 derived from a suitable negative point on the potentiometer 114 in the manner shown and understood from the drawing. Switch 117 is locked or held in its closed position by the armature 116 in the non-attracted position by a projection or nose upon the latter engaging a notch or the like in the switch-operating member as indicated in the drawing.

In operation, after the phototube 15 has been properly positioned upon the screen 13 upon closing the manual lamp switch 62, the latter is opened and the printing paper put in place upon the printing screen or surface 110. Thereupon, multiple switch 117 is closed to initiate the exposure or printing operation. Accordingly, an initial high negative potential will be applied to the grid of the tube 113, thus preventing a plate current flow and maintaining the relay 115 in the non-attracted position shown. This initial negative grid potential is then counteracted by the gradually increasing potential difference across the condenser 112, being charged through the phototubes at a rate depending upon the impedance of the latter, that is, in turn depending upon the density of the negative 10. Varying charging periods will therefore be required to reduce the initial negative grid potential of the tube 113 to a predetermined value by the condenser discharge to cause a response of the polarized relay 115 in the plate circuit and to attract the armature 116 to release the switch 117, resulting in an opening of the lighting circuit and termination of the exposure. In order to prevent a response of relay 115 in the normal position, as shown, the grid of tube 113 may be biased negatively to an extent less than the bias applied upon closing of the exposure switch, but sufficient to keep the plate current safely below the value necessary to actuate the relay 115. In the drawing, this is shown by the provision of a further pair of switch contacts simultaneously operable with the switch 117 and connecting the grid of tube 113 to a relatively low negative potential point on the potentiometer 114 in the normal or open position of the exposure switch.

Instead of collecting the light from the total negative area directly by a lens as shown in the drawings, a further semi-conducting mirror 119 may be suitably placed in the path of the projected light beam, as shown in Figure 8.

Figure 9 illustrates a further modification of an automatic print control system according to the invention utilizing an optical system as shown in Figure 8 and embodying a gaseous relay or thyratron tube 120 as a means to switch off the illumination in place of the polarized relay. Tube 120 serves to operate an ordinary relay 121 inserted in its anode circuit which in turn controls the illumination of the lamp 11.

In the normal position of the multiple switch 122, as shown in the drawing, the grid and cathode of the tube 120 are shunted by a large resistance 123, on the one hand, and by the phototubes 14 and 15, on the other hand, the latter being connected in parallel in the example illustrated. The grid and cathode of tube 120 are further permanently shunted by the relatively large condenser 124. Accordingly, the grid and cathode of tube 120 are normally at the same potential and a large ionic discharge current supplied by a high potential source in the form of potentiometer 114 or the like passes through the tube, thus causing attraction of the armature or relay 121 and interruption of the automatically controlled lighting circuit of the lamp 11.

After the phototube 15 has been properly positioned upon the screen 13 during closing of the auxiliary light-switch 62, the latter is opened and after a sheet of printing paper has been placed in position, the exposure switch 122 is closed momentarily and then released. Closing of switch 122 removes the operating voltage from the tube 120 by the opening of switch element 125, thus causing the output current to be interrupted and the relay 121 to release its armature and to close the automatic lighting circuit of the lamp 11. At the same time, opening of the switch element 126 interrupts the lamp circuit, thus preventing the lamp 11 from being lit while switch 122 is held in the depressed position. Furthermore, resistance 123 and the phototubes 14 and 15 are disconnected from the grid of the tube 120, the former by the opening of switch element 127, while at the same time condenser 124 is charged substantially instantly by the high potential source shown in the form of a condenser-shunted high ohmic resistance 114 connected to a suitable source of direct current through switch 125 and the relatively small resistance 128.

Upon release of the switch 122, the condenser charging circuit is again interrupted and full anode voltage applied to the tube 120, while at the same time reclosing of the switch element 126 will now result in a closing of the lamp circuit and initiation of the exposure. The discharge current through the tube 120 will, however, remain interrupted due to the high negative grid potential supplied by the charge of the condenser 124 until the latter has been discharged or dissipated through the phototubes 14 and 15 to a value sufficiently low to enable the tube to ignite and to cause attraction of the relay armature 121, thereby opening the lamp circuit and terminating the exposure. Any remaining charge on the grid of the tube 120 will then be dissipated through resistance 123, which should be substantially larger than the impedance of the phototubes to cause the condenser discharge to be determined substantially by the latter or, in turn, the density of the negative being printed.

However, by allowing part of the discharge to occur through the resistance 123, it is possible to adjust or control the response time and accordingly the exposure in order to take into account other exposure controlling factors, in particular varying paper speeds. In the latter case, resistance 123 may be variable and adjustable in accordance with a scale 130 representing different paper speeds or other exposure controlling values. The voltage source 114 is advantageously shunted by a gaseous stabilizing tube 131, to insure safe and accurate results and operation of the system.

Other means to influence the exposure time for calibration or adjustment of the system may be in the form of variable steady grid bias potentials or light intensity control devices such as density filters placed in front of the photoelectric deposits such as shown at 132 in Figure 9.

While I have shown a few practical embodiments of the invention, it will be evident that the underlying principal and novel inventive concept are susceptible of numerous variations and modifications utilizing equivalent devices and circuits in place of those shown for illustration and coming within the broader scope and spirit of the invention as defined in the appended claims. The specification and drawings are accordingly to be regarded in an illustrative rather than in a restrictive sense.

I claim:

1. In a photographic printing apparatus, a light source for exposing a transparency to be printed, photoelectric means fixedly mounted and adapted to produce a first current varying in proportion to the total integrated density of said transparency, further photoelectric means adjustably mounted to produce a second current varying in proportion to the density of a selectable fractional portion of said transparency, and means for additively combining said first and second currents and translating the combined currents into terms of exposure time of said source to insure a correctly exposed print from said transparency.

2. In a photographic printing apparatus, a light source for exposing a transparency to be printed, photoelectric means in fixed relation to said transparency to produce a first current varying in proportion to the total integrated density of said transparency, further photoelectric means adjustably mounted to produce a second current varying in proportion to the density of a selectable fractional portion of said transparency, means for additively combining said first and second currents and producing an indication of the combined current, and further means for translating said indication into terms of exposure time of said source to insure a correctly exposed print from said transparency.

3. In a photographic printing apparatus, a light source for exposing a transparency to be printed, photoelectric means in fixed relation to said transparency to produce a first current varying in proportion to the total integrated density of said transparency, further photoelectric means adjustably mounted to produce a second current varying in proportion to the density of a selectable fractional portion of said transparency, means for additively combining said first and second currents and producing an indication of the combined current, and a converter comprising a plurality of relatively adjustable scale means for translating said indication into terms of exposure time of said source for various speeds of printing material.

4. In a photographic printing apparatus, a light source for exposing a transparency to be printed, photoelectric means in fixed relation to said transparency and adapted to produce a first current varying in proportion to the total integrated density of said transparency, further photoelectric means adjustably mounted and having acceptance angle limiting means to produce a second current in proportion to the density of a selectable fractional portion of said transparency, current responsive means, means for connecting both said photoelectric means in parallel to said current responsive means, to produce a combined current exciting said current responsive means being proportional to the sum of said first and second currents, and further means for translating said indication into terms of exposure time of said source for a given speed of printing material to insure a correctly exposed print from said transparency.

5. In a photographic printing apparatus, a light source for exposing a negative to be printed, photoelectric means in fixed relation to said negative and adapted to produce a first current varying in proportion to the total integrated density of said negative, further photoelectric means adjustably mounted and having acceptance angle limiting means to produce a second current varying in proportion to the density of a selectable fractional portion of said negative, a load resistance, means for passing the sum of said first and second currents through said resistance, a discharge tube amplifier having input and output circuits, means for exciting said input circuit by voltage developed by said resistance, current indicating means connected to said output circuit, and means to translate the indication of said last means into terms of exposure time of said source to insure a correctly exposed print from said negative.

6. In a photographic printing apparatus, a light source for exposing a negative to be printed, photoelectric means in fixed relation to said negative and adapted to produce a first current varying in proportion to the total integrated density of said negative, further photoelectric means adjustably mounted and having acceptance angle limiting means to produce a second current varying in proportion to the density of a selectable fractional portion of said negative, a load resistance, means for passing the sum of said first and second current through said resistance, a discharge tube amplifier having input and output circuits, means for exciting said input circuit by voltage developed by said resistance, a current indicator having a movable pointer connected to said output circuit, a converting means comprising an adjustable scale member and cooperating with said pointer for translating the pointer deflection into terms of exposure time of said source for various speeds of printing material.

7. In a photographic printing apparatus, an electric light source for exposing a negative to be printed, photoelectric means in fixed relation to said negative and adapted to produce a first current varying in proportion to the total integrated density of said negative, further photoelectric means adjustably mounted and having acceptance angle limiting means to produce a second current varying in proportion to the density of a selectable fractional portion of said negative, a switch for connecting and disconnecting said source, means for combining said first and second currents to produce a control current varying according to the sum of said currents and automatic means for opening said switch after lapse of a time period determined by said control current.

8. In a photographic printing apparatus, an electric light source for exposing a negative to be printed, photoelectric means in fixed relation to said negative and adapted to produce a first current varying in proportion to the total integrated density of said negative, further photoelectric means adjustably mounted and having acceptance angle limiting means to produce a second current varying in proportion to the density of a selectable fractional portion of said negative, a switch for connecting and disconnecting said source, an electrical condenser, means for storing a potential upon said condenser proportional to the sum of the currents of both said photoelectric means, and further means to subsequently utilize the discharge current of said condenser to time the opening of said switch to thereby control the exposure time of said source in accordance with the negative density.

9. In a photographic printing apparatus, an electric light source for exposing a negative to be printed, photoelectric means in fixed relation to said negative and adapted to produce a first current varying in proportion to the total integrated density of said negative, further photoelectric means adjustably mounted and having acceptance angle limiting means to produce a second current varying in proportion to the density of a selectable fractional portion of said negative, a discharge tube having input and output circuits, a switch for connecting and disconnecting said source, a relay in said output circuit controlling said switch, and an electrical condenser connected to said input circuit and to both said photoelectric means to be charged by said combined first and second currents, whereby to disconnect said source after a lapse of time proportional to the negative density.

10. In a photographic printing apparatus, a light source for exposing a negative to be printed, mechanism for regulating the exposure time of said source comprising an electric circuit including a pair of photoelectric cells, one of said cells being arranged in fixed relation to said negative to be excited by light proportional to the total light flux passing through said negative, and the other of said cells being adjustable to be excited by light passing a selectable fractional portion of said negative, and means for producing and translating the sum of said currents in said circuit produced by both said cells into terms of printing time of said source for a given speed of printing material to insure a correctly exposed print from said negative.

11. A photographic printing apparatus comprising a light source and a lens to produce an enlarged real printing image from an original negative, beam-splitting mirror means between said lens and image to produce a further real image of said negative, first fixed photoelectric means arranged to be excited by light proportional to the total light flux passing through said negative, further adjustable photoelectric means for measuring the brightness of a selectable limited area of said further image, means for additively combining the output currents of both said photoelectric means and further means for utilizing the combined current for determining the exposure of a positive to be printed from said negative.

KARL RATH.

REFERENCES CITED

The following references are of record in the file of this patent:

UNITED STATES PATENTS

| Number | Name | Date |
| --- | --- | --- |
| 2,038,430 | Jameson | Apr. 21, 1936 |
| 2,090,825 | Anthony et al. | Aug. 24, 1937 |
| 2,183,217 | Goldsmith | Dec. 12, 1939 |
| 2,238,762 | Whitaker | Apr. 15, 1941 |
| 2,298,344 | Burnham | Oct. 13, 1942 |
| 2,309,048 | Curry | Jan. 19, 1943 |
| 2,378,433 | Riszdorfer | June 19, 1945 |
| 2,382,220 | Fogle | Aug. 14, 1945 |